United States Patent [19]

Taguchi

[11] Patent Number: 5,608,859
[45] Date of Patent: Mar. 4, 1997

[54] SCENARIO EDITING APPARATUS

[75] Inventor: Daigo Taguchi, Tokyo, Japan

[73] Assignee: NEC Corporation, Tokyo, Japan

[21] Appl. No.: 365,007

[22] Filed: Dec. 28, 1994

[30] Foreign Application Priority Data

Dec. 28, 1993 [JP] Japan .................................. 5-334161

[51] Int. Cl.⁶ .................................................. G06F 15/00
[52] U.S. Cl. ........................................ 395/792; 395/806
[58] Field of Search ................................... 395/154, 152, 395/159

[56] References Cited

U.S. PATENT DOCUMENTS 5,093,907  3/1992  Hwong et al. ........................ 395/152
5,191,645  3/1993  Carlucci et al. ..................... 395/159

FOREIGN PATENT DOCUMENTS 2-2456   1/1990  Japan .
3-41573  2/1991  Japan .

OTHER PUBLICATIONS

Michael D. Murie, Mediamaker Makes Mac Move (Macweek), Mar. 26 1991, pp. 1–3.

*Primary Examiner*—Mark K. Zimmerman
*Assistant Examiner*—Cliff N. Vo
*Attorney, Agent, or Firm*—Foley & Lardner

[57] ABSTRACT

A scenario editing apparatus by which presentation positions, presentation times and presentation effects of a plurality of multi-media data scenarios can be collectively designated and edited. The scenario editing apparatus comprises a storage section for storing multi-media data and one or more sets of media presentation information including media types, presentation positions, presentation times and presentation effects, a selection section for selecting two sets of media presentation information, a pair of storage sections for storing the selected two sets of presentation information, a determination section for comparing the two sets of presentation information stored in the storage sections to produce a presentation information template, a template production section for producing a scenario template from the presentation information template, a storage section for storing the scenario template, a storage section for storing data identifiers for identification of presentation data, media types, sizes and times, and a scenario production section for producing a scenario wherein the scenario template to be used and the data identifier to be presented are selectively related to each other.

3 Claims, 6 Drawing Sheets

FIG. 2

| SCENE NUMBER | DATA FILE | SCREEN SIZE | TIME LENGTH | MEDIA TYPE | PRESENTATION POSITION | PRESENTATION TIME | PRESENTATION EFFECT |
|---|---|---|---|---|---|---|---|
| 1 | PICT1.PIC | (100,150) | 15 | IMAGE | LEFT UPPER COORDINATES (10,10) | 1) START AT TIME OF 0 SECOND | CUT/WIPE |
| | TEXT1.TEX | (100,10) | 40 | TEXT | CENTER COORDINATES (350,200) | 2) START AT TIME OF 9 SECONDS | CUT/CUT |
| | PICT2.PIC | (100,150) | 10 | IMAGE | LEFT UPPER COORDINATES (10,10) | 3) AFTER END OF 2) | WIPE/FADE |
| | AUDI1.AUD | -- | 5 | SOUND | ------ | 4) START AT TIME OF 30 SECONDS | CUT/CUT |
| 2 | PICT3.PIC | (100,150) | 18 | IMAGE | LEFT UPPER COORDINATES (10,10) | 1) START AT TIME OF 0 SECOND | CUT/WIPE |
| | TEXT2.TEX | (100,10) | 10 | TEXT | CENTER COORDINATES (350,200) | 2) START AT TIME OF 5 SECONDS | CUT/CUT |
| | PICT4.PIC | (100,150) | 14 | IMAGE | LEFT UPPER COORDINATES (10,10) | 3) AFTER END OF 2) | WIPE/FADE |
| | AUDI2.AUD | -- | 5 | SOUND | ------ | 4) START AT TIME OF 30 SECONDS | CUT/FADE |

FIG.3

| MEDIA TYPE | PRESENTATION POSITION | PRESENTATION TIME | PRESENTATION EFFECT |
|---|---|---|---|
| IMAGE | LEFT UPPER COORDINATES(10,10) | 1) START AT TIME OF 0 SECOND | CUT/WIPE |
| TEXT | CENTER COORDINATES(350,200) | 2) START AT TIME OF 9 SECONDS | CUT/CUT |
| IMAGE | LEFT UPPER COORDINATES(10,10) | 3) AFTER END OF 2) | WIPE/FADE |
| SOUND | ------ | 4) START AT TIME OF 30 SECONDS | CUT/CUT |

FIG.4

| MEDIA TYPE | PRESENTATION POSITION | PRESENTATION TIME | PRESENTATION EFFECT |
|---|---|---|---|
| IMAGE | LEFT UPPER COORDINATES(10,10) | 1) START AT TIME OF 0 SECOND | CUT/WIPE |
| TEXT | CENTER COORDINATES(350,200) | 2) START AT TIME OF 5 SECONDS | CUT/CUT |
| IMAGE | LEFT UPPER COORDINATES(10,10) | 3) AFTER END OF 2) | WIPE/FADE |
| SOUND | ------ | 4) START AT TIME OF 30 SECONDS | CUT/FADE |

FIG.5

| MEDIA TYPE | PRESENTATION POSITION | PRESENTATION TIME | PRESENTATION EFFECT |
|---|---|---|---|
| IMAGE | LEFT UPPER COORDINATES(10,10) | 1) START AT TIME OF 0 SECOND | CUT/WIPE |
| TEXT | CENTER COORDINATES(350,200) | 2) | CUT/CUT |
| IMAGE | LEFT UPPER COORDINATES(10,10) | 3) AFTER END OF 2) | WIPE/FADE |
| SOUND | ------ | 4) START AT TIME OF 30 SECONDS | |

FIG.6

| MEDIA TYPE | PRESENTATION POSITION | PRESENTATION TIME | PRESENTATION EFFECT |
|---|---|---|---|
| IMAGE | LEFT UPPER COORDINATES(10,10) | 1) START AT TIME OF 0 SECOND | CUT/WIPE |
| TEXT | CENTER COORDINATES(350,200) | 2) START AT TIME OF 7 SECONDS | CUT/CUT |
| IMAGE | LEFT UPPER COORDINATES(10,10) | 3) AFTER END OF 2) | WIPE/FADE |
| SOUND | ------ | 4) START AT TIME OF 30 SECONDS | CUT/CUT |

FIG. 7

| TEMPLATE NUMBER | OBJECT DATA NUMBER | MEDIA TYPE | PRESENTATION POSITION | PRESENTATION TIME | PRESENTATION EFFECT |
|---|---|---|---|---|---|
| 1 | 4 | IMAGE | LEFT UPPER COORDINATES (10,10) | 1) START AT TIME OF 0 SECOND | CUT/WIPE |
| | | TEXT | CENTER COORDINATES (350,200) | 2) START AT TIME OF 7 SECONDS | CUT/CUT |
| | | IMAGE | LEFT UPPER COORDINATES (10,10) | 3) AFTER END OF 2) | WIPE/FADE |
| | | SOUND | ----- | 4) START AT TIME OF 30 SECONDS | CUT/CUT |

| DATA ID | MEDIA TYPE | SCREEN SIZE | TIME |
|---|---|---|---|
| 1 | IMAGE | (100,150) | 15 |
| 2 | IMAGE | (100,150) | 10 |
| 3 | SOUND | --- | 5 |
| 4 | TEXT | (100,10) | 40 |
| 5 | IMAGE | (100,150) | 18 |
| 6 | IMAGE | (100,150) | 14 |
| 7 | SOUND | --- | 5 |
| 8 | TEXT | (100,10) | 40 |
| 9 | IMAGE | (100,200) | 100 |

| SCENARIO NUMBER | TEMPLATE NUMBER | DATA ID |
|---|---|---|
| 1 | 1 | 1,4,2,3 |
| 2 | 1 | 5,8,6,7 |

SCENARIO EDITING APPARATUS

BACKGROUND OF THE INVENTION

1. Field of the Invention

This invention relates to a scenario editing apparatus, and more particularly to a scenario editing apparatus for editing a scenario of a multi-media application.

2. Description of the Related Art

In editing of a scenario of a multi-media application, presentation information including the presentation position of at which position of a screen image data, text data, sound data or some other data should be each presented or to which data each such data should be presented in a side-by-side relationship, the presentation time of at what time each such data should be presented or next to which data each such data should be presented and the presentation effect of whether or not fade-in/fade-out should be performed upon presentation or whether or not wiping processing should be performed upon changing over of the screen, must be designated. Further, upon editing a scenario of a large-scale multi-media application, in order to allow such presentation information as described above to be designated collectively, a template of the presentation information must be produced.

Such a scenario editing apparatus as shown in FIG. 10 is conventionally known.

Referring to FIG. 10, the conventional scenario editing apparatus shown includes a scenario template production section 11 for producing a scenario template including the number of data which is an object of the template and, the types of the media, presentation timing information and presentation effect information of each data, a scenario template storage section 12 for storing scenario templates produced by the scenario template production section 11, a media data storage section 13 for storing data identifiers (IDs) for identification of presentation data, the types of the media, the sizes, the times, keywords and so forth, a scenario production section 14 for selecting a scenario template to be used from among the scenario templates stored in the scenario template storage section 12 and selecting data to be presented from among the data stored in the media data storage section 13 to produce a scenario in which the number of the selected scenario template and the data ID are related to each other, a scenario storage section 15 for storing scenarios produced by the scenario production section 14, and an input/output management section 16 constituted from an inputting device such as a keyboard or a mouse and a cathode ray tube (CRT) display unit for displaying a list of presentation times, presentation effects and media data so as to allow selection of the user.

The conventional scenario editing apparatus, however, is disadvantageous in that, in order to produce a template of presentation information, the presentation information to make up the template must be inputted piece by piece by means of a keyboard or a mouse. Also it is disadvantageous in that, even where media presentation information which makes an example of presentation information is present already in the form of electronic data, it is impossible to produce a template of presentation information to edit a scenario making use of the data.

SUMMARY OF THE INVENTION

It is an object of the present invention to provide a scenario editing apparatus by which, where media presentation information which designates presentation positions, presentation times and/or presentation effects of multi-media data is stored, a presentation information template can be produced to edit a scenario making use of the stored data.

In order to attain the object described above, according to the present invention, there is provided a scenario editing apparatus, which comprises media presentation information storage means for storing one or more sets of media presentation information including multi-media data including image data, text data and sound data and information of media types, presentation positions, presentation times and presentation effects of the individual data, presentation information selection determination means for selecting two sets of media presentation information from among the sets of media presentation information stored in the media presentation information storage means and comparing the presentation information including the media types, the presentation positions, the presentation times and the presentation effects of the selected two sets of media presentation information to determine a presentation information template including the media types, the presentation positions, the presentation times and the presentation effects of data to be presented, media data storage means for storing data identification information or keywords for individual identification of the multi-media data and media types, media sizes and/or times of the data, scenario template production means for producing a scenario template by adding, to the presentation information template determined by the presentation information selection determination means, a number for identification of the template and the number of data which is an object of the template, scenario production means for producing a scenario wherein the data identification information or keyword of data to be presented from among the data identification information or keywords stored in the media data storage means is related to the scenario template produced by the scenario template production means, and input/output management means for managing inputting by a user of the scenario editing apparatus upon selection of media presentation information, determination of a presentation information template, production of a scenario template and production of a scenario and visually displaying the data used in the editing and a result of the edition.

The presentation information selection determination means may include a media presentation information selection section for selecting two sets of media presentation information from among the sets of media presentation information stored in the media presentation information storage means, a pair of presentation information storage sections for individually storing the two sets of media presentation information selected by the media presentation information selection section, and a presentation information template determination section for comparing the information of the presentation positions, the presentation times and the presentation effects of the two sets of media presentation information stored in the presentation information storage sections to determine a template of presentation information.

Preferably, the scenario editing apparatus further comprises scenario template storage means for storing the scenario template produced by the scenario template production means, and scenario storage means for storing the scenario produced by the scenario production means.

In the scenario editing apparatus, where one or more sets of media presentation information including multi-media data and information of media types, presentation positions, presentation times and presentation effects of the individual data are stored, two sets of media presentation information are selected from among the stored sets of media presentation information. Then, the pieces of presentation information including the media types, the presentation positions, the presentation times and the presentation effects of the thus selected two sets of media presentation information are compared with each other to determine a presentation information template which includes the media types, the presentation positions, the presentation times and the presentation effects of data to be presented, and a scenario is produced based on the thus determined presentation information template. Consequently, where media presentation information which can be utilized as examples of presentation information is stored, a presentation information template can be produced to edit a scenario making use of the thus stored media presentation information.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 2 is a table illustrating an example of media presentation information stored in a media presentation information storage section of the scenario editing apparatus;

FIG. 3 is a table illustrating an example of media types and presentation information stored in a first presentation information storage section of the scenario editing apparatus;

FIG. 4 is a table Illustrating an example of media types and presentation information stored in a second presentation information storage section of the scenario editing apparatus;

FIG. 5 is a table illustrating an example of a presentation information template determined by a presentation information template determination section of the scenario editing apparatus;

FIG. 6 is a table showing a presentation information template obtained by adding information by way of an input/output management section of the scenario editing apparatus to the presentation information template determined by the presentation information template determination section and illustrated in FIG. 5;

FIG. 7 is a table showing a scenario template produced by a scenario template production section and stored in a scenario template storage section of the scenario editing apparatus;

DETAILED DESCRIPTION OF THE PREFERRED EMBODIMENT

Figure 1:
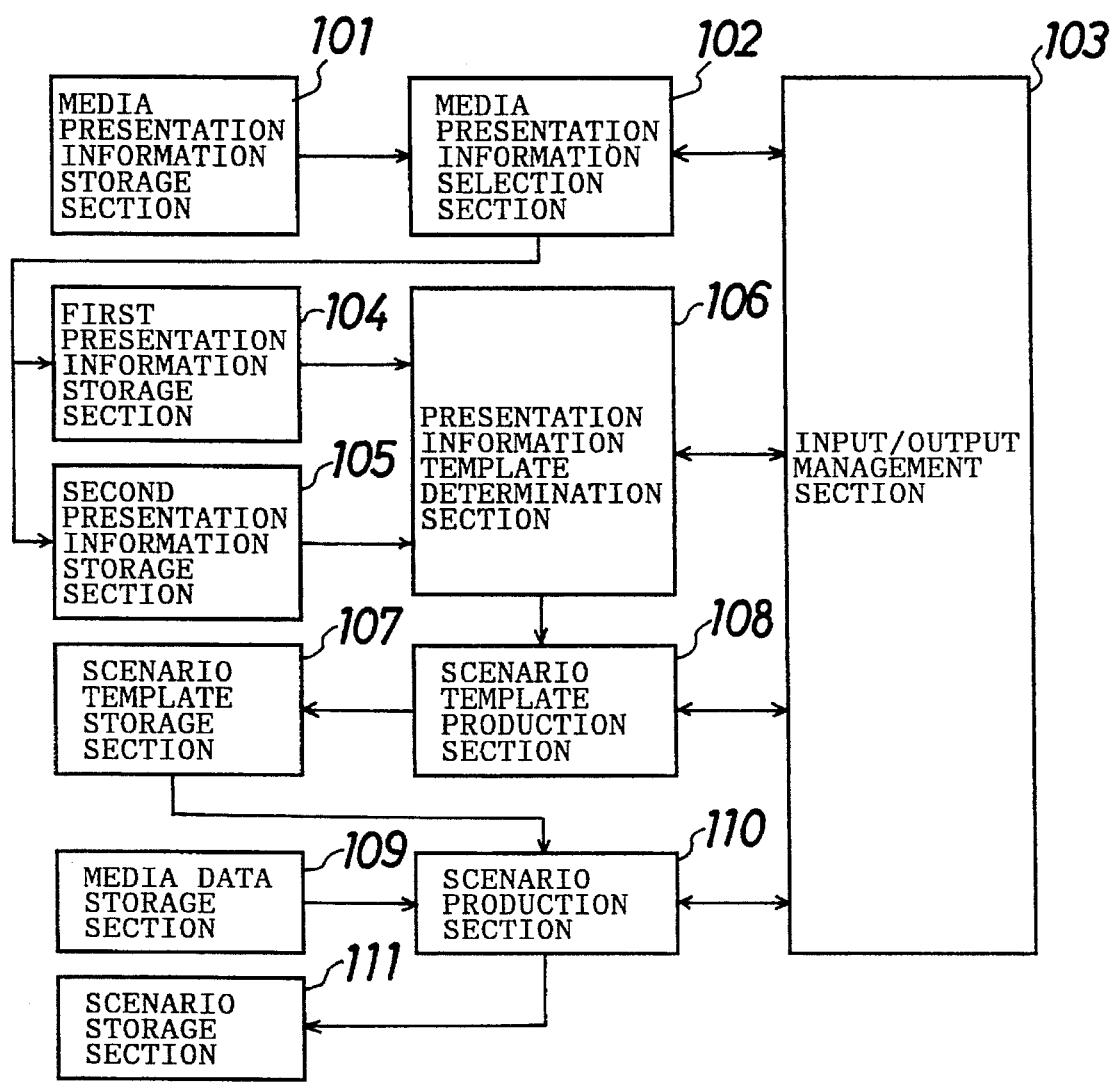
FIG. 1 is a block diagram of a scenario editing apparatus showing a preferred embodiment of the present invention.

Referring first to FIG. 1, there is shown a scenario editing apparatus according to a preferred embodiment of the present invention. The scenario editing apparatus shown includes a media presentation information storage section 101, a media presentation information selection section 102, an input/output management section 103, first and second presentation information storage sections 104 and 105, a presentation information template determination section 106, a scenario template storage section 107, a scenario template production section 108, a media data storage section 109, a scenario production section 110, and a scenario storage section 111.

The media presentation information storage section 101 stores a large number of, or one or more, sets of media presentation information including multi-media data and information of the presentation positions, the presentation times and presentation effects of the data. An example of such multi-media presentation information stored in the media presentation information storage section 101 is illustrated in FIG. 2.

The media presentation information selection section 102 selects two sets from within the large number of sets of media presentation information stored in the media presentation information storage section 101. The first and second presentation information storage sections 104 and 105 individually store presentation information including the media types, the presentation positions, the presentation times and the presentation effects included in the two sets of media presentation information selected by the media presentation information selection section 102. An example of the media types and the presentation information stored in the first presentation information storage section 104 is illustrated in FIG. 3 while an example of the media types and the presentation information stored in the second presentation information storage section 105 is illustrated in FIG. 4.

The presentation information template determination section 106 compares the various pieces of presentation information stored in the first presentation information storage section 104 and the second presentation information storage section 105 with each other to determine a presentation information template which is used to produce a scenario template. An example of the presentation information template determined by the presentation information template determination section 106 is illustrated in FIG. 5. Meanwhile, another presentation information template obtained by adding information to the presentation information template of FIG. 5 determined by the presentation information template determination section 106 by way of the input/output management section 103 is shown in FIG. 6.

The scenario template production section 108 adds, to the presentation information template determined by the presentation information template determination section 106, a number for identification of the template and the number of data which is an object to produce a scenario template which includes the template number, the number of data which is an object, and the media types, the presentation position information, the presentation time information and the presentation effect information of the data. The scenario template storage section 107 stores scenario templates produced by the scenario template production section 108. An example of a scenario template produced by the scenario template production section 108 and stored in the scenario template storage section 107 is shown in FIG. 7.

Figures 8, 9, 10:
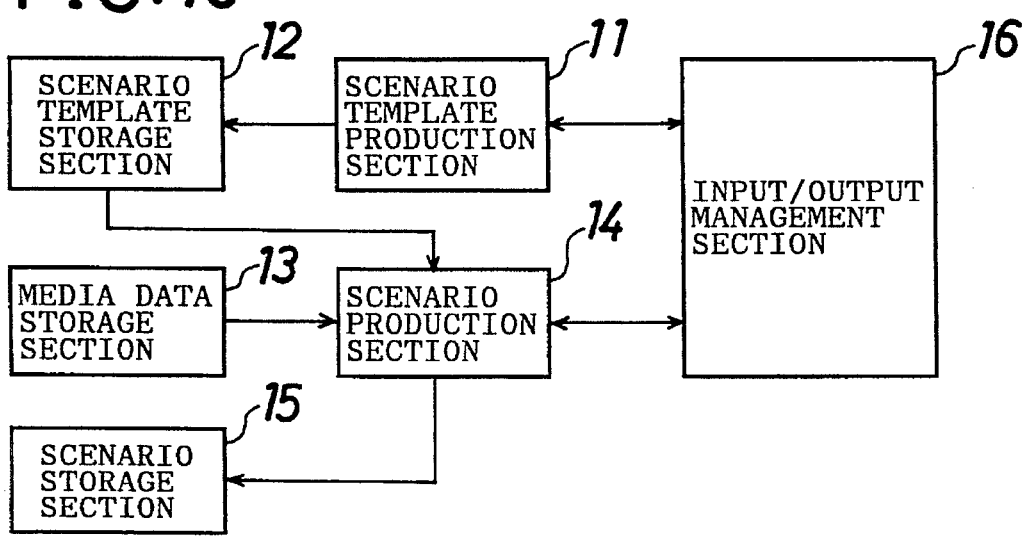
FIG. 8 is a table illustrating an example of media data stored in a media data storage section of the scenario editing apparatus.
FIG. 9 is a table illustrating an example of a scenario produced using the scenario template shown in FIG. 7 and the media data illustrated in FIG. 8.
FIG. 10 is a block diagram showing an exemplary one of conventional scenario editing apparatus.

The media data storage section 109 stores data identifiers (ID numbers) or keywords for identification of presentation data, and the media types, the sizes and the times of the individual data. An example of the media data stored in the media data storage section 109 is illustrated in FIG. 8.

The scenario production section 110 selects a scenario template to be used from among the scenario templates stored in the scenario template storage section 107 and selects data to be presented from the data stored in the media data storage section 109, and then produces scenarios in which the number of the selected scenario template and the data identifiers are related to each other. An example of a scenario produced using the scenario template shown in FIG. 7 and the media data illustrated in FIG. 8 is illustrated in FIG. 9.

The scenario storage section 111 stores such scenarios produced by the scenario production section 110. The input/output management section 103 is constituted from an inputting device such as a keyboard or a mouse and an outputting device such as a CRT display unit, and displays presentation positions, presentation timings, presentation effects and a list of media data so as to allow selection of the user.

Operation of the scenario editing apparatus of the present embodiment will be described below.

Here, the case wherein such two sets of media presentation information of the scene number 1 and the scene number 2 as illustrated in FIG. 2 are stored in the media presentation information storage section 101 and a scenario template is produced from the media presentation information to edit a scenario is considered. Here, the media presentation information signifies information which describes a data file name or the like for identification of multi-media data of a basic unit to be displayed on the screen and the type of the media, the presentation size on the screen, the time length upon presentation, the presentation position, the presentation time, the presentation effect and so forth in a mutually related condition.

First, the media presentation information selection section 102 causes the CRT display unit or the like of the input/output management section 103 to display thereon such a list of media presentation information as illustrated in FIG. 2, which is stored in the media presentation information storage section 101. Then, if two sets of media presentation information are selected by the user by way of the keyboard or the mouse of the input/output management section 103, then only the information of such media types, presentation positions, presentation times and presentation effects as illustrated in FIG. 3 from the first set of media presentation information is stored into the first presentation information storage section 104, and only the information of such media types, presentation positions, presentation times and presentation effects as illustrated in FIG. 4 from the second set of media presentation information is stored into the second presentation information storage section 105. In this instance, if the media presentation information storage section 101 has only one set of media presentation information, the media presentation information may be selected as the first and second sets of media presentation information.

Then, the presentation information template determination section 106 compares the media types and the presentation information stored in the first presentation information storage section 104 and the second presentation information storage section 105 with each other to extract same pieces of information to determine such a presentation information template as shown in FIG. 5. On the other hand, different pieces of information are displayed on the input/output management section 103 so that the user may select the information stored in the first presentation information storage section 104 or the information stored in the second presentation information storage section 105 or else average values of the information stored in the first presentation information storage section 104 and the information stored in the second presentation information storage section 105 to determine information for a template, and adds the thus determined information to the presentation information template. FIG. 6 illustrates an example of a template when an average value is selected as the presentation time of a text and information stored in the first presentation information storage section 104 is selected as the presentation effect for sound.

Thereafter, the scenario template production section 108 adds a new scenario template number which is not stored in the scenario template storage section 107 and the number of data which is an object of the template to such a presentation information template as shown in FIG. 7 determined by the presentation information template determination section 106 to produce a scenario template. Then, the scenario production section 110 selects a scenario template to be used from among the scenario templates stored in the scenario template storage section 107 and selects media data from among the media data stored in the media data storage section 109 as illustrated in FIG. 8 by way of the input/output management section 103, and produces such scenarios as shown in FIG. 9 in which the selected media data are related to the selected scenario template. The scenarios are stored into the scenario storage section 111 so that any of them may be read out and presented at any time.

Having now fully described the invention, it will be apparent to one of ordinary skill in the art that many changes and modifications can be made thereto without departing from the spirit and scope of the invention as set forth herein.

What is claimed is:

1. A scenario editing apparatus, comprising:

media presentation information storage means for storing a plurality of sets of media presentation information including multi-media data having image, text and sound data, and information indicative of media types, presentation positions, presentation times and presentation effects of the image, text and sound data;

presentation information selection and determination means for selecting two sets of media presentation information from among the plurality of sets of media presentation information stored in said media presentation information storage means and comparing the selected two sets of media presentation information to determine a new presentation information template in accordance with the media types, the presentation positions, the presentation times and the presentation effects of the selected two sets of media presentation information, said presentation information selection and determination means including a media presentation information selection means for selecting the two sets of media presentation information from among the plurality of sets of media presentation information stored in said media presentation information storage means, a pair of presentation information storage means for individually storing the two sets of media presentation information selected by said media presentation information selection means, and a presentation information template determination means for comparing the information of the presentation positions, the presentation times and the presentation effects of the two sets of media presentation information stored in said presentation information storage means to determine the new presentation information template;

media data storage means for storing data identification information for individual identification of the multimedia data;

scenario template production means for producing a scenario template by adding, to the new presentation information template determined by said presentation information selection and determination means, a number for identification of the new presentation information template and a number of data which is an object of the template;

scenario template storage means for storing the scenario template produced by said scenario template production means;

scenario production means for producing a scenario wherein the data identification information is related to the scenario template retrieved from said scenario template storage means;

scenario storage means for storing the scenario produced by said scenario production means; and input/output management means for managing inputs by a user of said scenario editing apparatus during selection of media presentation information, determination of the new presentation information template, production of the scenario template and production of the scenario and for displaying the data used in the editing and a result thereof.

2. The scenario editing apparatus as recited in claim 1, wherein said presentation information determination means determines the new presentation information template by averaging respective pairs of the presentation positions, the presentation times and the presentation effects of the two sets of media presentation information which are individually stored in said pair of presentation information storage means.

3. The scenario editing apparatus as recited in claim 1, wherein said presentation information determination means determines the new presentation information template by user-selection from respective pairs of the presentation positions, the presentation times and the presentation effects of the two sets of media presentation information which are individually stored in said pair of presentation information storage means.

* * * * *